Dec. 26, 1922.
G. S. WEBB.
DEMOUNTABLE RIM CONSTRUCTION.
FILED NOV. 10, 1920.
1,440,190
2 SHEETS-SHEET 1
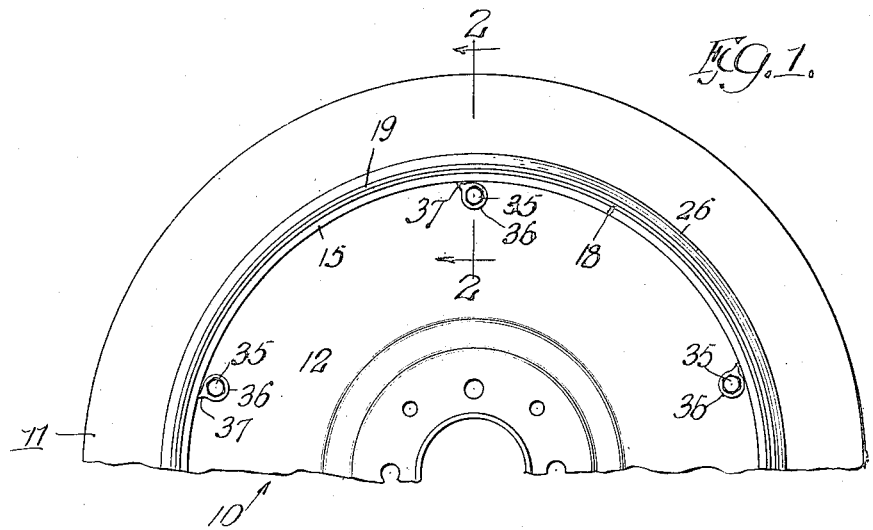
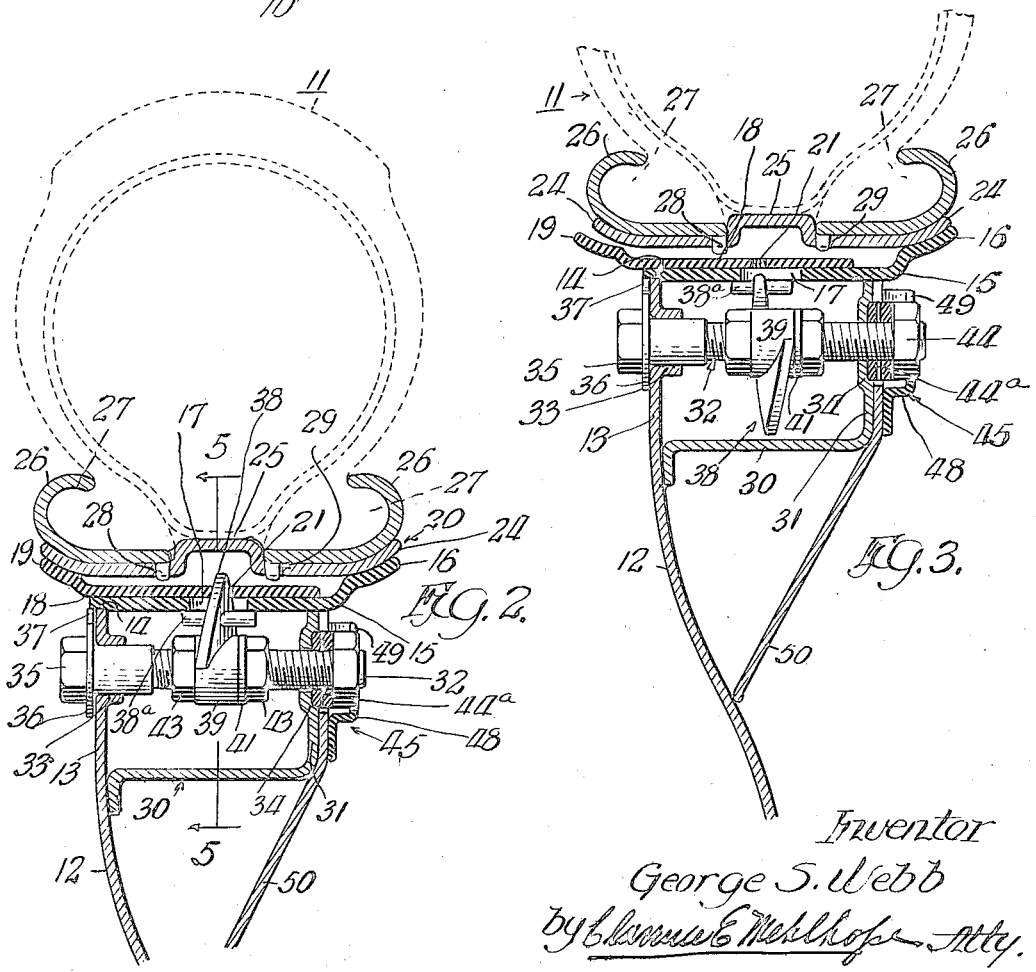
Inventor
George S. Webb

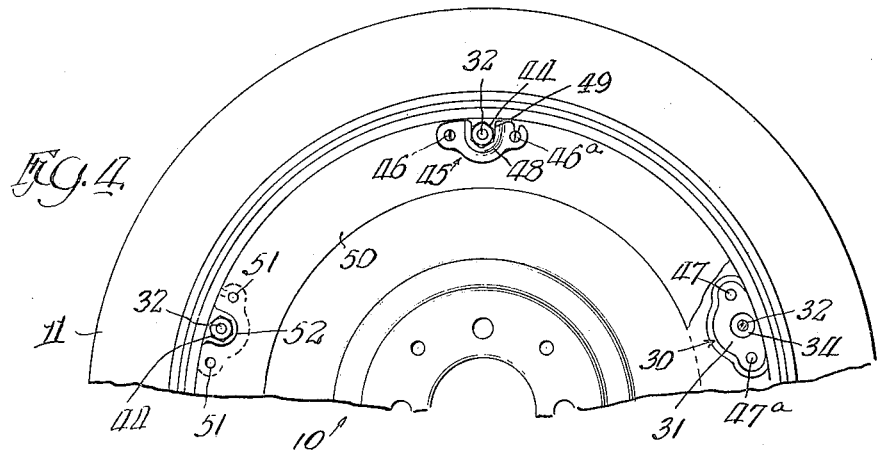
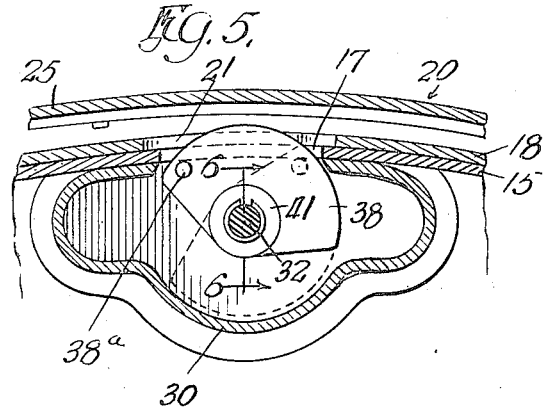
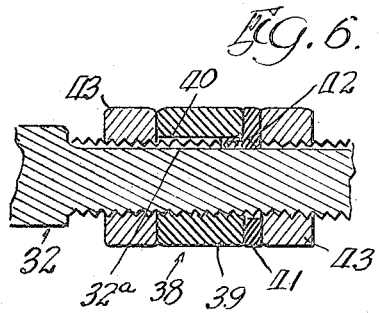
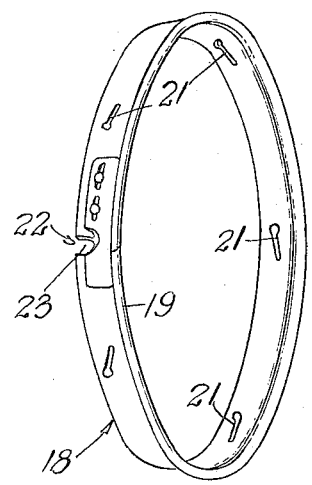
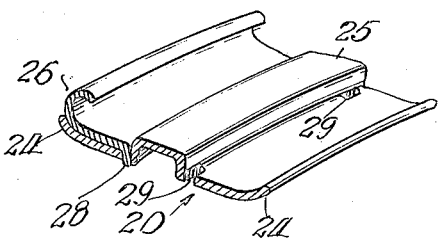

Patented Dec. 26, 1922.

1,440,190

UNITED STATES PATENT OFFICE.

GEORGE S. WEBB, OF AURORA, ILLINOIS.

DEMOUNTABLE RIM CONSTRUCTION.

Application filed November 10, 1920. Serial No. 423,102.

*To all whom it may concern:*

Be it known that I, GEORGE S. WEBB, a citizen of the United States, and a resident of Aurora, in the county of Kane and State of Illinois, have invented certain new and useful Improvements in Demountable Rim Constructions; and I do hereby declare that the following is a full, clear, and exact description thereof, reference being had to the accompanying drawings, and to the letters of reference marked thereon, which form a part of this specification.

This invention relates to improvements in demountable rim constructions for vehicle wheels, and consists of the matters hereinafter described and more particularly pointed out in the appended claims.

The object of the invention is to provide a rim construction permitting of a quick and easy application or removal of the tire holding rim to or from an associated wheel. The various advantages of my improved demountable rim construction will more fully appear as I proceed with my specification.

In the drawings:—

Figure 1 is a fragmentary view in front elevation, of an automobile wheel of the disc type, to which my improved rim construction has been applied.

Figure 2 is a vertical section through the rim of the wheel, on a line indicated by the line 2—2 of Figure 1.

Figure 3 is a view similar to Figure 2 but with some of the parts in a changed position.

Figure 4 is a fragmentary view in rear elevation, of a disc wheel to which my improved rim construction has been applied.

Figure 5 is a vertical detail sectional view taken on the line 5'—5 of Figure 2.

Figure 6 is a vertical detail sectional view on an enlarged scale taken on the line 6'—6 of Figure 5.

Figure 7 is a perspective view of a wedge ring embodied in my improved rim construction.

Figure 8 is a perspective view of a fragment of the tire carrying rim and a part of one of the tire bead shoes or rings.

In illustrating my invention, I have shown the same as applied to an automobile wheel of the disc type but as is apparent, the invention may with but slight changes, be as readily applied to wooden or wire wheels.

Referring now in detail to that embodiment of the invention illustrated in the accompanying drawings:—10 indicates as a whole, an automobile wheel of the disc type, and 11 indicates the pneumatic tire thereon. 12 indicates the steel disc which takes the place of the spokes in the familiar wooden or wire wheels, said disc having the usual holes near its center for attachment to the wheel hub. As shown, the disc is made with a perpendicular, peripheral marginal part 13 which fits in an annular groove 14 in the outer margin of a rim band 15, known as the "felly rim band" and is welded or otherwise secured thereto. The outer marginal part of the rim band projects slightly beyond the plane of the outer surface of said perpendicular marginal part of the disc, while the inner marginal part of the rim band extends a greater distance inward from the said marginal part of the disc, and terminates in a radially outwardly curved flange 16. Between the marginal parts of said band is provided a plurality of arcuately spaced, longitudinally elongated openings 17, the purpose of which will appear later.

18 indicates as a whole, a wedge ring (see Figure 7) which is adapted to engage or seat upon that part of the felly band, opposite the flange 16. Said wedge ring has a marginal radially outwardly extending flange 19, which, when the ring is on the band, coacts with the flange thereof to receive and hold a split spring rim 20. In said wedge ring are provided a plurality of arcuately spaced, angularly disposed slots 21, which register with the openings 17 in the rim band before mentioned. Said ring also has a split end locking means 22, and a notch 23 for the passage of the valve stem (not shown) of the tire 11.

The rim 20 is of a channel shape cross section, its lateral margins 24 being curved substantially radially outward while its middle portion is formed to provide a circumferential outwardly extending flat rib 25. When said rim is in place upon the wheel, the margins 24 engage upon the flanges of the felly band 16 and the wedge ring 17 respectively. The said marginal flanges of the rim provide grooves to receive the shoes or bead rings 26, on the tire beads 27. To prevent lateral or circumferential shifting between the bead shoes and rim, I provide coacting tongue and slot connections between them, the tongues 28 preferably being provided on the inner margins of the bead shoes and the slots 29 being provided in the rim adjacent the flat rib thereon (see Figure 8).

The wedge ring is adapted to be detachably secured in position at a plurality of arcuately spaced points on the felly band, preferably five different points as shown, but as is apparent, this number may be increased or decreased, according to the diameter of the wheel to which the invention is applied. Preferably I provide on the wheel near the felly band, devices which may so engage the wedge ring as to draw or withdraw the wedge ring into and from a tight wedging position between the felly band 15 and rim 20.

Secured to the inner face of the marginal part 13 of the disc and to the inner face of the felly band in the radial planes of the openings 17 in said felly band, are a plurality of hollow bosses or housings 30, there being of course one housing associated with each opening 17. Each housing includes a wall 31 which is parallel with the perpendicular marginal part of the disc, but arranged within the plane of the edge of the flange 16 on the felly band.

Journaled in the part 13 of the disc, and in the wall 31 of each housing, is a bolt 32, the flange 13 having an inturned sleeve 33, and the wall having an inwardly depressed recess 34 about the bolt opening. The outer end of each bolt has a head 35 to receive a wrench to actuate the bolt, a washer 36 being made integral with the head. Said washer has a point 37, which is adapted to engage the outer margin of the felly band and limit the rotative movement of the bolt. Secured to each bolt at its middle, is a spiral cam 38, which, in the rotation of the bolt, is adapted to engage in and be disengaged from the associated slot 21 in the wedge ring, so as to move said ring laterally, inward or outward. Said cam has a hub 39 which is locked to the bolt as follows. In the hub is a keyway 40 which is brought into register with a keyway 32$^a$ in the bolt 32 (see Figure 6). A washer 41 having a bent spline 42 is engaged upon the bolt from its inner end with the spline 42 engaging in the registering keyways in said cam hub and bolt respectively. Lock nuts 43 are provided to lock the parts in place. By this construction, the cam may be adjusted longitudinally on the bolt so that it may be properly positioned with respect to the slots 21 in the wedge ring 18. This is also advantageous in that any wear between the parts may be taken up. The cam carries oppositely extending pins 38$^a$ which are adapted to engage the felly band adjacent the holes 17 therein and assist the pointer 37 in limiting the rotation of said bolt.

On the inner end of each bolt 32 without the associated housing 30, is a nut 44, and surrounding said bolt and bearing in the recess 34 of the housing and against the nut is a stiff spiral spring 44$^a$. A bracket clip 45 is secured to the wall 31 of each housing by screws 46—46$^a$ (see Figure 4) which extend through holes and slots 47—47$^a$ in said wall, one on each side of the bolt 32. Said bracket includes an outwardly extending offset part or boss 48, which has a notch 49 opening through one edge of the clip. This notch is of such shape as to receive the nut in a manner preventing its rotation. Should it be found necessary to adjust the nut on the bolt, this may be done by loosening the screw 46$^a$ and swinging the bracket about the screw 46 to free the nut. After the nut has been adjusted, the bracket may be swung back in a reverse direction and secured to again lock the nut.

To prevent the adherence or accumulation of any mud or dirt to the inner surface of the felly band and to the housings 30, I provide a ring 50 which is interposed between said housings 30 and the brackets 45, its inner margin being bent toward the disc as shown in Figure 3. This ring has openings 51 for the screws 46—46$^a$ and has larger openings 52 to accommodate the nuts 44 of the bolts 32.

With the cam 38 in the position shown in dotted lines in Figure 5, the wedge ring may be inserted between the tire rim and felly band with the slots 21 in the ring registering with the openings 17 in the felly band. A wrench is applied to the head 35 of each bolt 32 in succession, turning the same counter clockwise. In this movement of the bolts, the cam will pass through said openings in the felly band and into said angularly disposed slots in the wedge ring, the cams acting to shift or pull the ring inwardly until the flange 19 on the ring engages the outer flange 24 of the tire rim. The parts are so proportioned that the wedge ring is drawn into its tightest wedging position before the bolt has been rotated as far as it will go. Thus during the latter part of the rotative movement of the bolts, the springs 44$^a$ will be compressed and tend to exert a pull on the bolts and thus lock the same against being loosened by vibration of the wheel in its use. This locking movement of the cams is also assisted by the reason of the fact that the bolts will thread outwardly of the nuts 44 and leave a small clearance between the washers 36 on the bolts and the marginal part 13 of the disc. To remove the rim, the bolts are turned the other way, and the cams will push the wedge ring outwardly to loosen its engagement between the tire rim and felly band.

The improved rim construction possesses many advantages. The tire rim may be quickly attached or removed from the wheel without the use of tools other than the usual socket wrench. The cams during the movement of the associated bolts forcibly draw the wedge ring into its proper position and lock the same, or forcibly withdraw the same so that the tire rim may be quickly removed. Even if the wedge ring has rusted on to the felly, the cams provide the necessary movement to break the bond between them and withdraw the wedge ring to permit the easy removal of the tire. Furthermore, the parts are so constructed that they will not loosen up, even under the action of running on a flat tire.

While in describing my invention, I have referred to certain details of mechanical construction and arrangement of parts, I do not wish to be limited thereto except as pointed out in the appended claims.

I claim as my invention:—

1. In combination, a wheel body provided with an outwardly extending tire-rim-supporting flange at one side thereof, a transversely movable wedge ring having a tire-rim-supporting flange at the opposite side of the wheel body, and a series of cams mounted on transversely extending axes in position to shift the wedge ring laterally in either direction on rotation thereof.

2. In combination, a wheel body provided with an outwardly extending tire-rim-supporting flange at one side thereof, and with a wedge ring supporting band within said flange, a transversely movable wedge ring engaged upon said band and having a tire-rim-supporting flange at the opposite side of the wheel, and a series of cams mounted on transversely extending axes in position to shift the wedge ring laterally in either direction on rotation thereof.

3. In combination with a wheel felly having a flange at one side thereof, a split spring wedge ring having slots therein adapted to engage on the other side of the felly, said flange and ring being adapted to receive and hold a tire rim, bolts extending transversely of the felly, means providing bearings for the bolts, and a spiral cam on each bolt and adapted to enter and to withdraw from said slots in the wedge ring to impart a lateral in and out movement to said wedge ring.

4. In combination with a wheel felly having a flange at one side thereof, a split spring wedge ring having slots therein adapted to engage on the other side of the felly, said flange and ring being adapted to receive and hold a tire rim, bolts extending transversely of the felly, means providing bearings for the bolts, each bolt having an operating head, a cam on each bolt adapted to engage in the wedge ring slots when the bolts are rotated, and means acting to produce an endwise tension on said bolts.

5. In combination with a wheel felly having a flange at one side thereof, a wedge ring having slots therein adapted to engage on the other side of the felly, the said flange and ring being adapted to receive and hold a tire rim, bolts extending transversely of the felly, means providing a bearing for the ends of each bolt, each bolt having an operating head, a cam on the bolt between its ends to engage the slots in the wedge ring to impart an in and out movement thereto, a nut on the other end of each bolt, a spring surrounding the bolt between said nut and one of the bearings for the bolt, and bracket clips to lock said nuts against rotation.

6. In combination with a disc wheel having a felly with a flange at one side thereof, a wedge ring adapted to engage on the other side of the felly, said flange and ring being adapted to receive a tire rim, housings secured to the disc and felly, bolts bearing in said discs and housings, cams on said bolts in said housings, nuts on said bolts outside the housings, brackets secured to said housings and receiving the bolts, and a mud guard ring engaging at its outer periphery upon said housing and engaging at its inner periphery with the discs, the bracket plates acting to hold the mud ring in place.

In testimony that I claim the foregoing as my invention, I affix my signature in the presence of two witnesses, this 6th day of November, A. D. 1920.

GEORGE S. WEBB.

Witnesses:
T. H. ALFREDS,
CHRISTINA DEANS.